May 23, 1961  A. I. PARKER  2,985,473
FLOATING SEAL
Filed Nov. 19, 1957
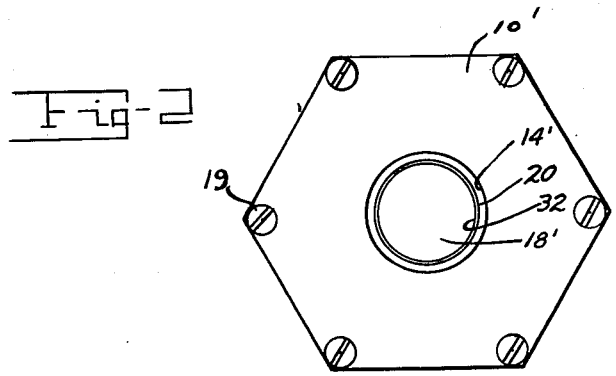
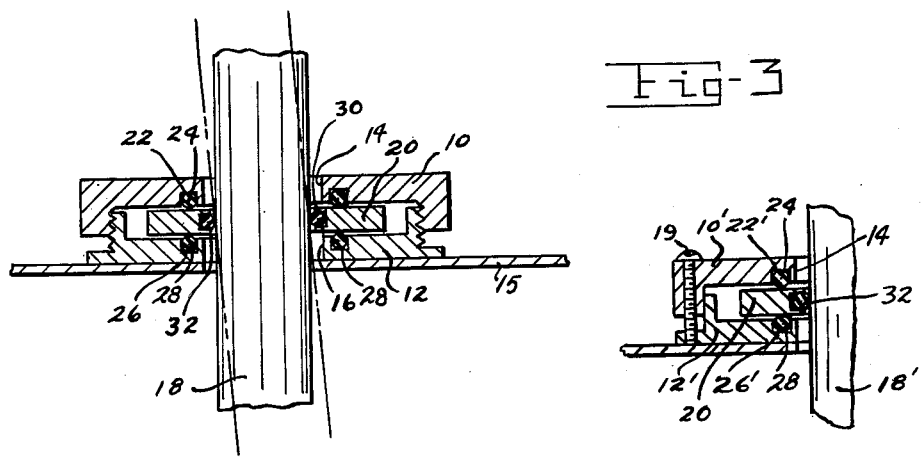
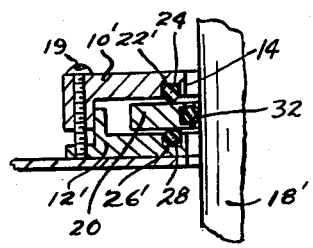
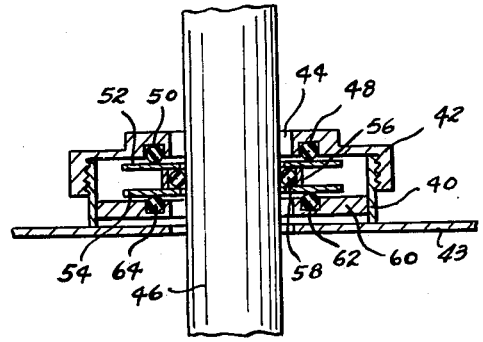
INVENTOR.
ALAN I. PARKER
BY
ATTORNEY United States Patent Office 2,985,473
Patented May 23, 1961

2,985,473
FLOATING SEAL

Alan I. Parker, Cincinnati, Ohio, assignor to the United States of America as represented by the Secretary of the Air Force Filed Nov. 19, 1957, Ser. No. 697,501
2 Claims. (Cl. 286—26)

The present invention relates to a floating seal and, more particularly, to a coupling containing a seal for piping, probes and other such equipment entering a pressurized area.

In many types of equipment, for example, fuel lines on aircraft where manipulation is necessary into a pressurized area, the problems involved in accomplishing entrance into these areas and means of entry of instruments without attendant pressure leaks, escape of fumes, possible injurious gases and other such problems are acute.

In practice, it is the present method to use simply a rubber bushing for this purpose. In many cases rubber is subject to attack by the fluids under pressure. The use of rubber for this purpose is additionally unsatisfactory due to its unsuitability for precision instruments and the cumbersomeness in its use. Furthermore, for lateral movement of the probe, the amount of force necessary is uncertain and there is danger of straining the probing instrument.

The object of the present invention is the provision of a seal for piping, probes and other instruments used in pressure areas which provides a contact surface substantially no more than a circular line, thus making possible tilting of the piping or probing instruments and an increase of tolerance for misalignment due to temperature change and allied causes, to a greater degree than was heretofore possible.

A further object of the invention is the provision of a floating seal as above noted, where any lateral movement of the probe entering the pressurized area requires a fixed amount of force and this being known, strain and damage to the probe is avoided.

A further object of the invention is the provision of a floating seal carried by two threadedly adjustable members wherein the bearing surface which is also a primary seal is provided by a single O ring and the secondary sealing surfaces are provided by a pair of O rings floated between the threaded members, pressure being applied by the adjustment of the threaded members.

Other objects and advantages of the invention will become apparent as the description proceeds.

In the drawings:

Fig. 1 is a cross sectional view of one form of the device.

Fig. 2 is a top plan view of a modified form.

Fig. 3 is a cross sectional view of the form of the device shown in Fig. 2.

Fig. 4 is a cross sectional view of a second modified form.

Referring more in detail to Fig. 1 of the drawing, 10 and 12 represent the upper and lower elements of a threaded coupling. The elements are provided with internal and external screw threads, respectively, and together form a housing. The element 10 may be hexagonal so that it may be engaged by wrenches and like instruments. The elements 10 and 12 are annular in formation and provided with circular openings 14 and 16 through their center areas which provide for the insertion and accommodation of a piping or probing instrument shown at 18 in each of Figs. 2 and 3.

It will be noted that the diameter of the piping is less than the diameter of the openings 14 and 16 so that considerable tilting or weaving or imperfections or misalignment in the equipment or the necessary manipulation of instruments can be accommodated. The housing elements 10 and 12 engage to form a coupling with space between them. The lower element 12 has a sealed connection with the wall or bulkhead 15 which separates the high and low pressure areas.

In the form shown in Figs. 2 and 3, the portions 10' and 12' of the coupling are not threaded, but are secured together by means of screws 19.

A carrying member 20 or a corresponding carrying unit is floated between the coupling elements. In the modifications of the invention of Figs. 1, 2 and 3, the carrying units are identical. Each comprises an annular single piece disk provided with smooth upper and lower planar surfaces and an annular channel on its interior circumference. The difference lies in the manner in which the coupling members 10 and 12 and 10' and 12' are fastened together. In Fig. 1 the upper housing element 10 has direct screw threaded connection with housing element 12. In Figs. 2 and 3, the means shown for securing the upper and lower housing elements together are bolts 19.

The housing elements 10 and 10' are provided with annular grooves 22 and 22', respectively. Each groove accommodates an O ring 24. The lower housing elements 12 and 12' are provided with similar annular grooves 26 and 26'. Each of the last mentioned grooves carries an O ring 28. The opening for accommodating the instrument 18' of Fig. 3 is shown at 14'.

The ring or circular plate 20 of Figs. 1 and 3 is provided with an annular channel 30 at its inner circumference. An O ring 32 is seated in the channel 30. The interior circumference of the O ring 32 may be smaller than the circumference of the piping or other instrumentation 18 so that a close, line fit is secured.

Pressure upon the O rings 24 and 28 can be modified by adjustment of the threadedly engaged members 10 and 12, and 10' and 12'.

In the form of the invention shown in Fig. 4, the elements 10 and 12 of Fig. 1 are replaced by an annular collar 40 and a coupling member 42 which form the housing. Members 40 and 42 are provided with engaging external and internal screw threads, respectively. The collar 40 has a sealed connection with a bulkhead or wall 43 which separates the high and low pressure areas. The coupling member 42 which may be hexagonal in top plan, is provided with an opening 44 through which piping 46 or other instrumentation may pass. The member 42 is provided with an annular groove 48 similar in formation and function to the channel or groove 24 of Fig. 1, and accommodating O ring 50. The floating member 20 is replaced by a pair of washers 52 and 54, which are separated by an annular collar 56. The washers 52 and 54 and the collar 56 form a channel area which accommodates the O ring 58. The washers and collar may be welded to form a unit or they may be assembled separately. A member 60 is provided with a groove or channel 62 in its upper edge, which seats the O ring 64. A double seal is thus formed by contact of the O rings 50 and 64 with the upper surface of the washer 52 and the lower surface of the washer 54, respectively.

As in the form shown in Figs. 1 and 3, the O ring 58 may be slightly smaller than the piping or other instrumentation which is inserted through it so that it can clasp the piping tightly and form a single line bearing, allowing for tilting, misalignment, etc. The two washers 52 and 54 and the intervening collar 56 form a carrying device replacing the ring 20 of Fig. 1. The element 60 replaces the member 12 for carrying the lower sealing ring 64.

It will be seen that the sealing device is longitudinally symmetrical, i.e., symmetrical with respect to a transverse axis, that the seal is effected with a minimum number of parts and that it is equally effective with high pressure areas located on either side of the seal. It will also be apparent that the device, while extremely effective, is made from a minimum number of easily machined parts.

While the invention is shown and described in connection with one form for illustrative, rather than restrictive purposes, it is obvious that changes and modifications may be made by those skilled in the art without departing from the scope and spirit of the invention as defined in the accompanying claims.

I claim:

1. A tiltable probe for entering a pressurized area and a floating seal therefor comprising a housing for said floating seal, an opening through said housing of greater dimensions than the diameter of said probe to allow tilting and lateral movement of said probe, a seal carrying unit in said housing, said seal carrying unit having an opening therein for said probe, an upper sealing and floating means located in the interior of said housing and comprising an O ring in an annular channel in said housing, a lower seal and floating means located in said housing and comprising an O ring inserted in a second annular channel in said housing, a third O ring seated in the inner surface of the opening in said seal carrying unit, said last-named O ring forming a line bearing seal for said probe.

2. A longitudinally symmetrical sealing device for a probe or other instrument entering a pressurized area comprising, a longitudinally symmetrical seal carrying unit having upper and lower planar surfaces, a housing surrounding said seal carrying unit and having an opening therein for said probe or instrument, an O ring located between the inner upper surface of said housing and the upper surface of said unit, a second O ring located between the lower inner surface of said housing and the lower planar surface of said carrying unit, said carrying unit comprising a pair of planar elements and a separating annular collar, an opening in each of said elements of larger dimensions than the dimension of said probe or other instrument to allow tilting of said probe or other instrument, said collar and said planar elements forming a channel on the inner circumference of said carrying unit, a single line bearing comprising an O ring located in said channel for grasping and sealing said probe or other instruments.

References Cited in the file of this patent

UNITED STATES PATENTS

| | | |
|---|---|---|
| 1,411,197 | Smith | Mar. 28, 1922 |
| 2,535,288 | Honkanen | Dec. 26, 1950 |
| 2,742,306 | Kelso | Apr. 17, 1956 |